No. 622,503. Patented Apr. 4, 1899.
G. D. LEADBETTER.
PERAMBULATOR.
(Application filed July 8, 1898.)
(No Model.)
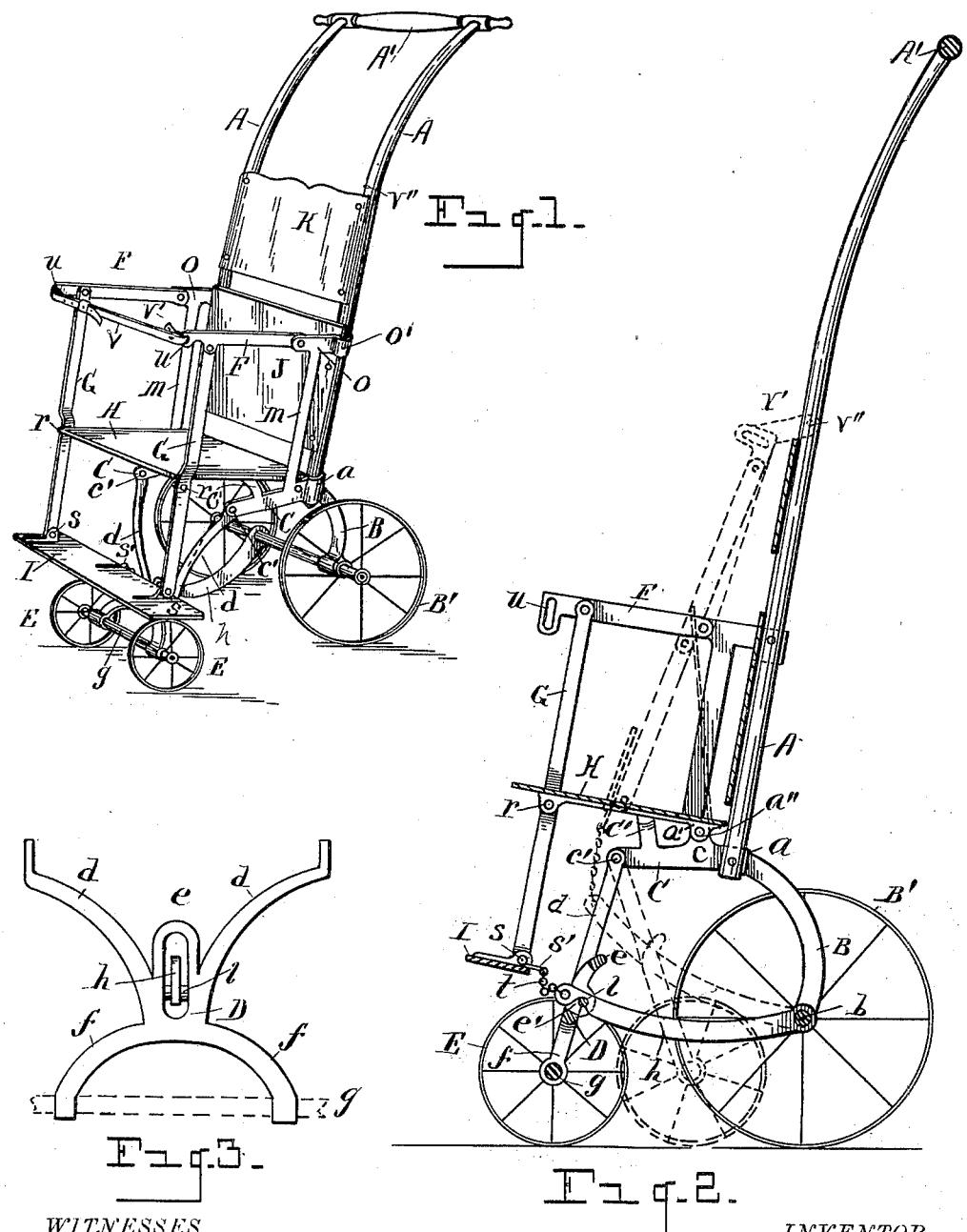
WITNESSES. INVENTOR.
George D Leadbetter
By
Attorneys.

UNITED STATES PATENT OFFICE.

GEORGE D. LEADBETTER, OF DETROIT, MICHIGAN.

PERAMBULATOR.

SPECIFICATION forming part of Letters Patent No. 622,503, dated April 4, 1899.

Application filed July 8, 1898. Serial No. 685,414. (No model.)

*To all whom it may concern:*

Be it known that I, GEORGE D. LEADBETTER, a citizen of Canada, residing at Detroit, in the county of Wayne, State of Michigan, have invented certain new and useful Improvements in Perambulators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in perambulators; and it consists in the construction and arrangement of parts hereinafter fully set forth and pointed out particularly in the claims.

The object of the invention is to provide a folding perambulator of strong, simple, and inexpensive construction, in which the arrangement is such as to enable the perambulator to be folded so as to occupy but a small space when not in use, and a further arrangement whereby the perambulator may be readily unfolded to place it in a transporting position, and in which position it affords a firm and secure seat for the occupant. This object is attained by the mechanism illustrated in the accompanying drawings, in which—

Figure 1 is a perspective view of my improved perambulator. Fig. 2 is a vertical transverse section through the perambulator, showing by dotted lines the parts in their folded position. Fig. 3 is an enlarged detail of the pivotally-hung spider carrying the forward wheels and having a central loop through which the locking-arm pivoted to the rear axle is adapted to pass.

Referring to the letters of reference, A designates the uprights or handles, which constitute the main frame of the perambulator. The lower ends of said uprights enter suitable sockets $a$, from which extend the rearwardly and downwardly curved arms B, adapted at their lower ends to embrace the rear axle $b$, which is journaled therein and which carries at its opposite ends the large transporting-wheels B'. Projecting from the sockets $a$ are the brackets $c$, having the forwardly-extending arms C, to the forward ends of which the upper legs $d$ of the spider D are pivoted, as at $c'$. The lower legs $f$ of said spider extend downwardly from the body thereof and carry the forward axle $g$, which is journaled therein and carries at its opposite ends the forward transporting-wheels E. The body of the spider D is provided with a rearwardly-curved loop $e$, adapted to receive the forward end of the curved locking-bar $h$ and having a transverse pin $i$ standing across the lower portion of the opening of said loop. The curved locking-bar $h$ is pivoted upon the rear axle and extends forward, its outer free end passing through the loop $e$ and having a notch $e'$ therein, adapted to receive the pin $i$ to maintain the forward wheels E in their extended position.

Extending from the brackets $c$ are the uprights $m$, having at their upper ends the brackets $o$, provided with the rearwardly-extending partially-closed eyes $o'$, embracing the uprights A. Pivoted to the forward ends of the brackets $o$ are the arms F, the forward ends of which are pivoted to the upper ends of the vertical bars G, which depend on either side of the seat H, and to which the outer edge of said seat is pivoted, as at $r$. The lower ends of said bars G extend below said seat and support the foot-rest I, which is pivoted at $s$ thereto. Extending rearwardly from said foot-rest is a short arm $s'$, which is connected by means of a chain $t$ with the forward end of the locking-bar $h$. The rear edge of the seat is provided with a depending ear $a'$, which is pivoted at $a''$ to the bracket $c$, thereby permitting said seat to fold upwardly against the uprights A.

The forwardly-projecting ends of the arms F are provided with a loop $u$, through which a strap $v$ may be passed to retain the occupant upon the seat of the perambulator. A short end $v'$ of said strap is adapted to engage a screw $v''$ on one of the uprights A to retain the parts in a folded position, as shown by dotted lines in Fig. 2.

Projecting upwardly from each of the arms C is a stud C', which engages the bottom of the seat to maintain it in an extended position, as shown in Figs. 1 and 2, serving as a firm support for said seat when extended.

When it is desired to fold this perambulator so that it shall occupy a comparatively small space when not in use, the operator raises the outer end of one of the arms F, causing the other arm to swing upward, at the same time carrying upward the bars G on the outer edge of the seat H, so that said seat will fold back against the uprights A, as shown by dotted lines in Fig. 2. As the bars G are carried upwardly the foot-rest I is also raised, causing the chain $t$, attached thereto, to also raise the locking-bar $h$, so as to disengage it from the pin $i$. As said bar in its upward movement engages the upper portion of the loop $e$ of the spider D said spider is caused to swing inwardly on the pivot $c'$, so that the small forward wheels E will lie between the rear wheels B', as also shown by dotted lines in Fig. 2, thereby materially reducing the space occupied by the perambulator, enabling the perambulator to be readily carried by hand into a street-car or other public conveyance or placed entirely out of the way when not in use. When desired for use, the strap end $v'$ is disengaged from the screw $v''$, permitting the arms and seat to drop to their normal position, (shown in Fig. 1,) releasing the locking-arm $h$, so that the spider carrying the forward wheels $e$ may swing outwardly until the pin $i$ in the loop of said spider enters the notch $e'$ in the outer end of said locking-arm, when said wheels are locked from further outward movement and the device is in position for service, as shown by solid lines in Figs. 1 and 2.

By reason of the fact that the small wheels extend forward nearly in line with the outer edge of the seat all liability of the device to tip forward is obviated and the weight is more equally distributed between the front and rear wheels, enabling the child to climb into the seat by stepping upon the foot-rest without causing the perambulator to tip forward. The placing of the large wheels behind, so as to receive the greater portion of the weight, causes the perambulator to run more easily and greatly facilitates passing over an elevation, such as a step or the curb, as the perambulator may be tilted backward upon the large wheels sufficiently to place the forward wheels upon the elevation, when the perambulator may be passed easily over.

Crossing between the uprights A and serving to tie them together are the strips of veneering J and K, affording a back and head rest for the occupant of the seat.

The upper ends of the curved uprights A are connected by a cross-spindle A', which serves as a handle to propel the perambulator.

Having thus fully set forth my invention, what I claim as new is—

1. In a perambulator, the combination of the uprights, the large wheels journaled at the lower ends of said uprights, the small wheels pivoted in front of said large wheels, the pivoted seat and pivoted arms, the pivoted bar adapted to lock the forward wheels when extended, and means connecting said pivoted seat with the free end of said locking-bar.

2. In a perambulator, the combination of the uprights, the large wheels journaled at the lower ends of said uprights, the forwardly-extending arms mounted on said uprights, the forward wheels journaled in a frame pivoted to the forward end of said arms, the seat pivoted to fold upwardly, the studs on said arms adapted to support said seat when extended, and means for locking the frame carrying the forward wheels to maintain said wheels in an extended position.

3. The combination of the uprights, the large wheels journaled to the lower ends of said uprights, forwardly-extending arms mounted on said uprights, a spider-frame pivoted to the outer ends of said arms, the forward wheels journaled in said frame, a pivoted locking-bar lying in a loop in said spider-frame and having a notch adapted to engage a pin in said loop, a pivoted seat and pivoted arms, studs engaging the under face of said seat to maintain it in an extended position, bars pivotally connecting said pivoted arms and said pivoted seat, a foot-rest on the lower ends of said bars, and means connecting said foot-rest with the forward end of said locking-bar.

In testimony whereof I sign this specification in the presence of two witnesses.

GEORGE D. LEADBETTER.

Witnesses:
E. S. WHEELER,
M. A. MARTIN.